Aug. 14, 1962   C. J. GAHLINGER   3,048,916
METHOD OF MAKING PASSAGEWAY PANEL FROM FOLDED METAL SHEET
Filed July 22, 1957

INVENTOR
CLARENCE J. GAHLINGER

BY Arthur H. Robert
ATTORNEY

United States Patent Office 3,048,916
Patented Aug. 14, 1962

3,048,916
METHOD OF MAKING PASSAGEWAY PANEL FROM FOLDED METAL SHEET
Clarence J. Gahlinger, Louisville, Ky., assignor to Reynolds Metals Company, Richmond, Va., a corporation of Delaware
Filed July 22, 1957, Ser. No. 673,459
4 Claims. (Cl. 29—157.3)

This invention relates to an improved method for making pressure welded passageway panels from a single metal sheet.

A conventional method for making pressure welded passageway panels from a single metal sheet is described in the U.S. Patent No. 2,754,572 to Arthur F. Johnson, issued July 17, 1956. The Johnson method comprises: (1) providing a suitable foreshortened flat ductile metal sheet; (2) weakening said flat sheet along an intermediate hinge line to divide it into a pair of adjacent sheet portions; (3) cleaning said flat sheet; (4) printing a foreshortened "wet" weld resist pattern; (5) drying said pattern; (6) folding said sheet along the hinge line to sandwich the "dry" weld resist pattern between said sheet portions; (7) heating said folded sheet to a suitable pre-rolling temperature; (8) hot rolling said heated and folded sheet to elongate it, to reduce its thickness and to weld its overlapped surfaces together over the areas which are not separated by said weld resist pattern to form a pressure welded panel containing an unwelded potential passageway area; and (9) pressure expanding the unwelded internal area of said panel to form passageways. Since the original metal sheet and weld resist pattern are elongated or lengthened about 300% during the rolling step, they are originally provided with a starting "length" of about ⅓ of their final "length." The term "foreshortened" is used in this art to designate a starting length which is several times smaller than the final length.

The principal object of this invention is to provide an improved method of making a pressure welded passageway panel from a single metal sheet in which the drying and heating steps of the Johnson method are combined into a single step.

Another object of this invention is to provide an improved method of making a pressure welded passageway panel in which the "wet" weld resist pattern is substantially covered immediately after printing to protect it from dust and other foreign materials.

These objects are achieved in my improved method by folding the printed sheet along the weakened hinge line to an acute angle of substantially less than 90° and substantially more than 1°, say about 15°, with the "wet" weld resist pattern on one of the inner faces forming the 15° angle, and heating the acutely folded sheet to a suitable pre-rolling temperature. With this arrangement, one sheet can be made to extend horizontally and the other can be inclined 15° to the vertical whereby the uppermost of these two sheets shields the wet resist pattern and practically all of the inner face of the lower sheet against the dust which tends to settle out of the atmosphere. During the heating of the acutely folded sheet to a pre-rolling temperature, the "wet" weld resist pattern is dried initially. Subsequently, during the same heating step, the metal along the weakened hinge line is softened sufficiently to render the weight of the upper sheet portion effective to close the acute angle between them and thereby automatically complete the folding of the sheet. Hence, it will be seen that the single step of heating the sheet dries the "wet" weld resist pattern, completes the folding of the sheet and brings it to a pre-rolling temperature.

The invention is illustrated in the accompanying drawing wherein.

The improved method is described in connection with the making of an aluminum pressure welded passageway panel but it should be understood that the method can also be used with other suitable metals such as copper, bronze and brass.

In practicing the invention, a single metal sheet 10 of aluminum is selected having a thickness of about .140 inch, a width substantially equal to the width desired in the pressure welded panel and in the starting blank for that panel and a length equal to twice the length desired in the foreshortened starting blank for the pressure welded panel. The term "starting blank" refers to the sheet after it is folded and before it is rolled. By foreshortened length, I mean the dimension of the starting blank in the direction of rolling at a time prior to the rolling operation. The direction of rolling is indicated by the arrows in FIGS. 1, 2 and 4.

Figure 1:
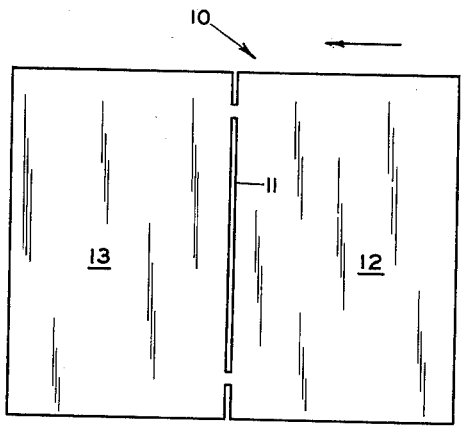
FIG. 1 is a plan view of a suitable metal sheet or blank in an initial stage of practicing the invention and having a weakened central hinge line dividing it into halves.

The sheet 10 is weakened along an intermediate or central hinge line 11 to divide it into halves comprising a sheet portion 12 and an adjacent sheet portion 13. The intermediate hinge line 11 can be formed by suitably grooving the back of the sheet 10 as described in the previously mentioned Johnson patent, or by cutting a series of separated slots in the sheet 10 along the hinge line 11 as illustrated in FIG. 1.

The sheet 10 is then conventionally cleaned by washing it in a caustic bath, rinsing it in water, washing it in an acid bath to remove any oxide coating, re-rinsing it in water and then drying it.

Figure 2:
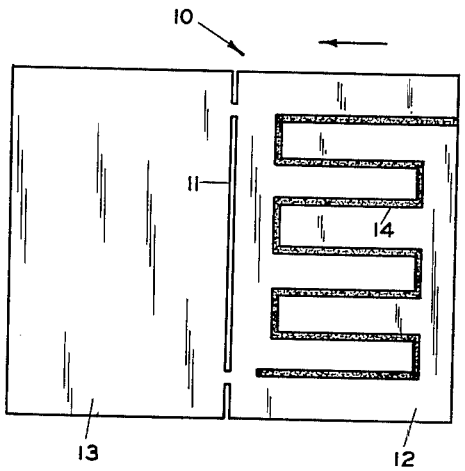
FIG. 2 is a plan view of the sheet of FIG. 1 with a weld resist pattern printed on one sheet half.

In the next step of practicing my improved method, a foreshortened weld resist passageway pattern 14 is printed on the upper face of the sheet portion 12 as illustrated in FIG. 2. The weld resist pattern 14 may be formed of a suitable weld resist material known to the prior art and may be printed by using conventional methods such as by the silk screen method. After being printed, the weld resist pattern 14 is "wet" and consequently, must be dried before being touched to keep it from being smeared.

In the previously mentioned Johnson method, the "wet" weld resist pattern is dried prior to folding the sheet portions 12 and 13 together to sandwich the weld resist pattern 14 between them.

Figure 3:
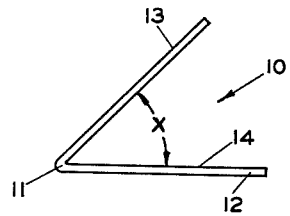
FIG. 3 is an end elevational view of the sheet of FIG. 2 with one sheet half partially folded at an acute angle to face the weld resist pattern on the other sheet half prior to being heated.

In my improved method, the sheet 10, immediately after being printed, is partially folded along the intermediate hinge line 11 to dispose the sheet portion 13 at an acute angle to and facing the weld resist pattern 14 printed on the sheet portion 12 as seen in FIG. 3. This acute angle is not critical, but should be substantially less than 90° and substantially more than 1° so that the sheet portion 12 substantially covers the weld resist pattern 14 without touching it and thereby aids in protecting the pattern 14 and the inner faces of the sheet portions from dust and other material which might otherwise settle on them during the drying of the weld resist material. I have found that an acute angle X, as seen in FIG. 3, of about 15° works very nicely with aluminum sheet and conventional weld resist materials used with aluminum. However, the ideal acute angle will vary depending on many factors, for example, the kind of metal sheet used, and the temperature of the furnace used to heat the partially folded metal sheet.

Following the partial folding of the sheet 10, it is heated in a suitable furnace while resting in the position illustrated in FIG. 3, i.e., with one sheet portion supported horizontally while the adjacent sheet portion is inclined above it at an acute angle. During the heating of the sheet 10 the weld resist pattern 14 is rapidly dried as the temperature of the sheet 10 is initially raised. As the temperature of the sheet 10 is raised further, the aluminum in the vicinity of the weakened hinge line 11 is softened whereby the weight of the inclined sheet portion 13 causes it to settle onto the sheet portion 12 to complete the folding of the sheet 10 and to sandwich the weld resist pattern 14 between the two sheet portions 12 and 13. Although completely folded, the sheet portions 12 and 13 remain connected along the hinge line 11 so that one sheet portion cannot slide relative to the opposite sheet portion. Meanwhile, the temperature of the completely folded sheet 10 is increased to a suitable pre-rolling temperature of about 900 to 950° F.

Figure 4:
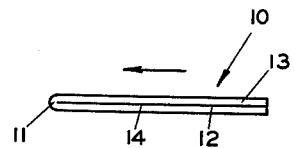
FIG. 4 is an end elevational view of the sheet of FIG. 3 after being heated and prior to being roll welded.

Following the heating of the folded sheet 10, it is hot rolled in the direction of the arrow of FIG. 4 to reduce its thickness approximately 60%, to elongate it in the direction of rolling about 300% and to pressure weld together the overlapped facing areas of the sheet portions 12 and 13 which are not separated by the weld resist pattern 14 and thereby provide a pressure welded aluminum panel 15 internally containing an unwelded potential passageway area.

Figure 7:
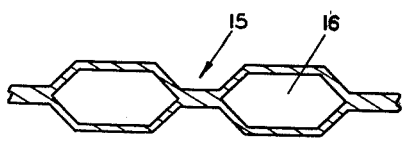
FIG. 7 is an enlarged section of an expanded pressure welded passageway panel.

The unwelded internal area of the pressure welded panel 15 formed by the weld resist pattern 14 is then pressure expanded to form passageways 16 as indicated in FIG. 7. A conventional method for pressure expanding pressure welded passageway panels is described in the U.S. No. 2,662,273 to George R. Long.

My improved method can also be used to pressure weld passageway panels having three or more layers. In making a three layer panel, a flat metal sheet 20 is divided into a series of three sheet portions 21, 22 and 23 by a pair of weakened intermediate hinge lines 24. After a pair of "wet" weld resist passageway patterns 25 are appropriately printed on the sheet 20, such as on the top face of the sheet portion 21 and on the bottom face of the sheet portion 23, the sheet 20 is folded to a Z-shape along the hinge lines 24 whereby the sheet portion 22 is inclined at acute angles to the sheet portions 21 and 23 and with the weld resist patterns 25 facing the inclined sheet portion 22 as illustrated in FIG. 5.

Figure 6:
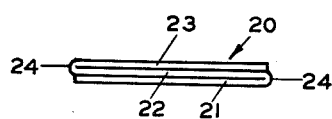
FIG. 6 is an end elevational view of the sheet of FIG. 5 after being heated and prior to being roll welded.
Figure 5:
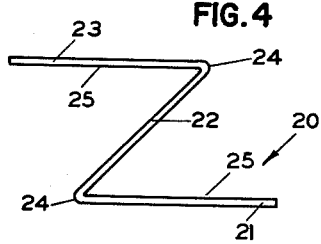
FIG. 5 is an end elevational view similar to FIG. 3 of a modified metal sheet for forming a three layer pressure welded panel.

Thereafter, the partially folded sheet 20 is heated while resting as shown in FIG. 5 to dry the "wet" weld resist patterns, to complete the folding of the sheet 20 as shown in FIG. 6 and to raise the temperature of the sheet 20 to a suitable pre-rolling temperature. The sheet 20 is then roll welded and pressure expanded using known methods.

Having described my invention, I claim:

1. In the art of making a pressure welded passageway panel, an improved method of preparing a metal sheet assembly for pressure welding, comprising: providing a foreshortened ductile metal sheet with a weakened hinge line to divide it into a pair of connected sheet portions presenting adjacent inner faces; printing a wet foreshortened weld resist pattern on the inner face of one of said sheet portions; and, while the pattern is wet, partially folding said sheet along said hinge line in the direction required and to the extent required to cause their inner faces to oppose each other across an acute angle of substantially less than 90° and substantially more than 1°.

2. The improved method of claim 1 including: heating the partially folded sheet to dry said foreshortened weld resist pattern.

3. The improved method of claim 2 wherein: said heating step is performed with one sheet portion supported substantially horizontally and the other sheet portion inclined above it.

4. In the art of making a pressure welded passageway panel, an improved method of preparing a metal sheet assembly for pressure welding, comprising: providing a foreshortened ductile metal sheet with a weakened hinge line to divide it into a pair of adjacent sheet portions; printing a foreshortened weld resist pattern on one of said sheet portions; partially folding said sheet along said hinge line to an acute angle of substantially less than 90° and substantially more than 1° with the weld resist pattern on said one sheet portion facing the other sheet portion; holding said partially folded sheet in a position rendering its weight effective to close said acute angle upon an appropriate softening of its hinge line; and heating said held sheet to an elevated temperature to soften its weakened hinge line sufficiently to render the weight of said sheet effective substantially to close said acute angle and thereby substantially complete the folding of said sheet.

References Cited in the file of this patent

UNITED STATES PATENTS

| 458,115 | Thomson | Aug. 18, 1891 |
| 2,095,071 | Loeb | Oct. 5, 1937 |
| 2,754,572 | Johnson | July 17, 1956 |

FOREIGN PATENTS

| 729,216 | Germany | Dec. 11, 1942 |